UNITED STATES PATENT OFFICE.

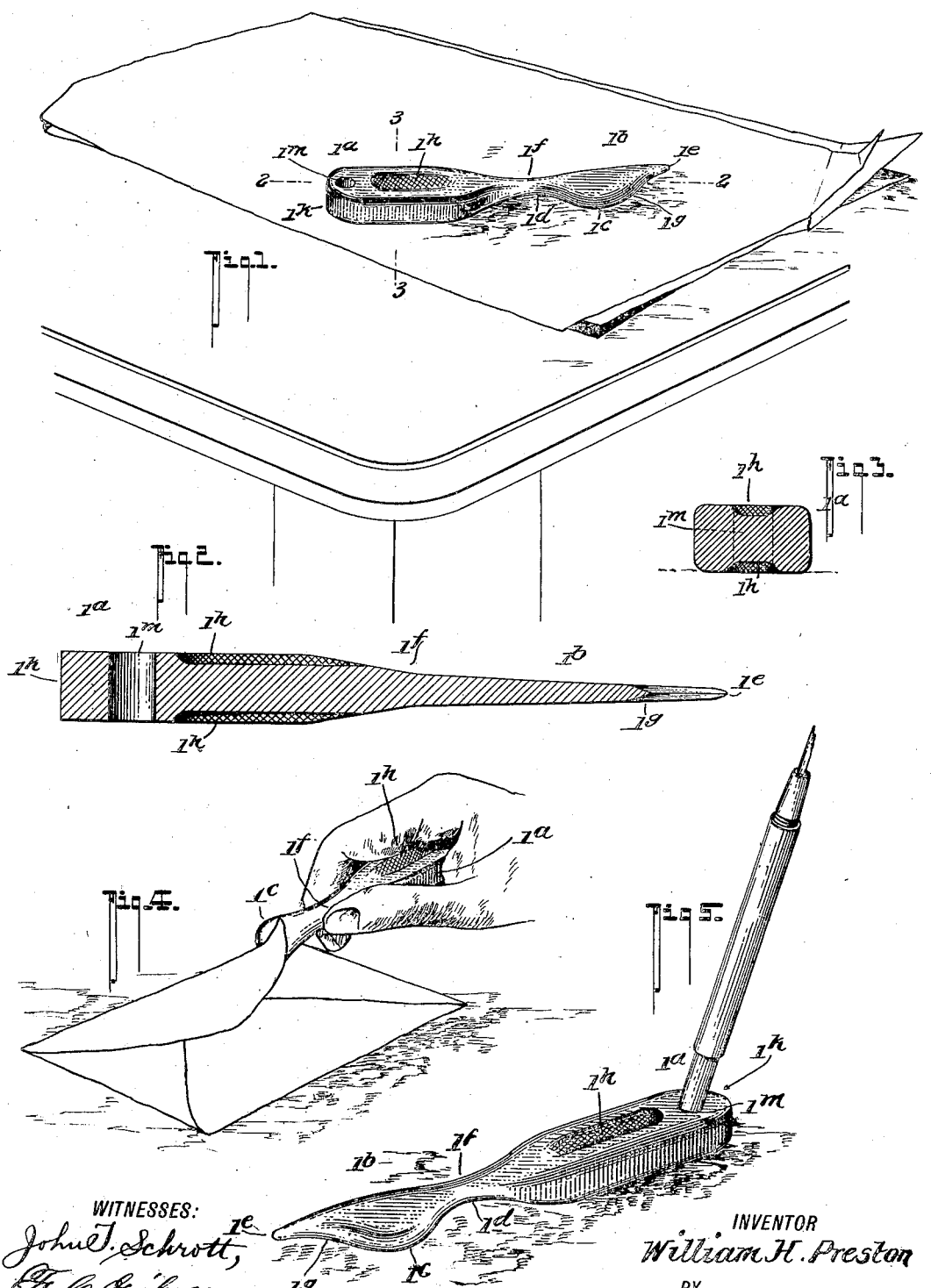

WILLIAM H. PRESTON, OF VALLEY JUNCTION, WISCONSIN, ASSIGNOR OF ONE-HALF TO FREDERICK C. WARREN, OF VALLEY JUNCTION, WISCONSIN.

DESK-TOOL.

No. 830,614.   Specification of Letters Patent.   Patented Sept. 11, 1906.

Application filed December 21, 1905. Serial No. 292,825.

*To all whom it may concern:*

Be it known that I, WILLIAM H. PRESTON, residing at Valley Junction, county of Monroe, and State of Wisconsin, have invented certain new and useful Improvements in Desk-Tools, of which the following is a specification.

My invention relates to certain new and useful improvements in desk-tools, and it more particularly seeks to provide a tool embodying an envelop-opener, paper-cutter, paper-weight, ink-eraser, pointer or index finger, pencil-sharpener, match-igniter, and pencil-holder.

My invention seeks to provide a device of the foregoing character of a very simple, compact, and effective construction, which will readily serve its intended purposes and which can be cheaply and easily manufactured.

With other objects in view than have heretofore been specified the invention also comprises a detailed construction of tool of the character stated, all of which will be first described in detail and then be specifically pointed out in the appended claims, reference being had to the accompanying drawings, in which—

Figure 1 is a perspective view of my improved tool, showing the same in use as a paper-weight. Fig. 2 is a longitudinal section on the line 2 2 of Fig. 1. Fig. 3 is a cross-section on the line 3 3 of Fig. 1. Fig. 4 is a perspective view showing my invention in use as an envelop-opener. Fig. 5 is a similar view showing the same in use as a penholder.

Referring now to the accompanying drawings, in which like numerals of reference indicate like parts in all of the figures, 1 comprises a weighted portion $1^a$, which also serves as a handle for the implement when used as an envelop-opener or as a knife-eraser. Merging with the handle $1^a$ and extending forwardly thereof is a blade $1^b$, which comprises a knife-edge $1^c$, which extends from the points $1^d$ to the point $1^e$ of the tool and is formed with a curved edge, as shown. The tool is thinner, as at $1^f$, so as to provide a convenient finger-grip when the same is in use as a scraper or as an envelop-opener.

When the invention is in use as an envelop-opener, the point $1^e$ is inserted into the envelop and the envelop cut open by the cutting edge $1^g$ of the knife portion of the tool, as shown in Fig. 4.

$1^h$ $1^h$ designate elongated cupped portions whose surfaces are roughened or provided with a file-face, so as to serve as a pencil-sharpener or as a match-igniter, as desired.

The handle portion $1^a$ near its end $1^k$ is provided with an aperture $1^m$, extending through the handle to serve as a penholder, as shown in Fig. 5.

By reference to the drawings, it will be seen that the handle portion $1^a$ is considerably thicker than the blade portion $1^b$, so that when the instrument is not in use the same will lie in the position shown in Fig. 1 with the blade portion of the tool elevated from the table, so as to avoid the knife portion of the tool from coming in contact with the table to prevent it from becoming dull and to prevent scratching of the table.

From the foregoing description, taken in connection with the accompanying drawings, it will be seen that I have provided a very simple and effective instrument of the character stated which can be easily and cheaply manufactured and which will readily serve its intended purposes.

Having thus described my invention, what I claim, and desire to secure by Letters Patent, is—

1. An instrument of the character stated, comprising a weighted handle portion and a blade portion, said blade portion having a curved knife-eraser portion, an envelop-cutting blade portion and a point, and said handle portion having elongated grooves on its upper and lower faces, said grooves being provided with roughened faces, substantially as shown and described.

2. An instrument of the character stated, comprising a weighted handle portion and a blade portion, said blade portion having a curved knife-eraser portion, an envelop-cutting blade portion and a point, and said handle portion having elongated grooves on its upper and lower faces, said grooves being provided with roughened surfaces, and said handle being provided with a transverse aperture to serve as a penholder substantially as shown and described.

3. A tool of the character stated, comprising a weighted handle portion $1^a$, said handle portion having a pair of roughened surfaces $1^h$ $1^h$ and a bore $1^m$, a blade portion $1^b$ integrally formed with said handle portion and of less thickness than the handle portion and terminating in a point $1^e$ and provided with an eraser portion $1^c$ and a knife-edge $1^g$ to serve as an envelop-opener, all being arranged substantially as shown and described.

WILLIAM H. PRESTON.

Witnesses:
W. H. PRICE,
MADGE GRISWOLD.